(12) United States Patent
McElhoe et al.

(10) Patent No.: US 12,321,789 B2
(45) Date of Patent: Jun. 3, 2025

(54) PROVIDING ACCESS TO DATACENTER RESOURCES IN A SCALABLE MANNER

(71) Applicant: VMware LLC, Palo Alto, CA (US)

(72) Inventors: Glenn Bruce McElhoe, Arlington, MA (US); Stephen A. Evanchik, Danvers, MA (US)

(73) Assignee: VMWare LLC, Palo Alto, CA (US)

( * ) Notice: Subject to any disclaimer, the term of this patent is extended or adjusted under 35 U.S.C. 154(b) by 698 days.

(21) Appl. No.: 17/581,955

(22) Filed: Jan. 23, 2022

(65) Prior Publication Data

US 2023/0236898 A1 Jul. 27, 2023

(51) Int. Cl.
| | |
|---|---|
| G06F 9/50 | (2006.01) |
| H04L 9/32 | (2006.01) |
| H04L 67/2895 | (2022.01) |
| H04L 67/56 | (2022.01) |

(52) U.S. Cl.
CPC ............ G06F 9/505 (2013.01); H04L 9/3213 (2013.01); H04L 67/2895 (2013.01); H04L 67/56 (2022.05)

(58) Field of Classification Search
CPC ..... G06F 9/505; G06F 9/5072; H04L 9/3213; H04L 67/2895; H04L 67/56; H04L 63/0281; H04L 63/0807; H04L 63/0884; H04L 63/102; H04W 12/084
See application file for complete search history.

(56) References Cited

U.S. PATENT DOCUMENTS

| | | | |
|---|---|---|---|
| 2012/0102134 A1* | 4/2012 | Burckart | ................ G06F 13/00 709/213 |
| 2020/0412826 A1* | 12/2020 | Levy Nahum | ...... H04L 43/0864 |
| 2021/0011816 A1* | 1/2021 | Mitkar | ................. G06F 11/301 |
| 2021/0234919 A1* | 7/2021 | Paralikar | ............... H04L 67/563 |

OTHER PUBLICATIONS

Non-Published Commonly Owned Related U.S. Appl. No. 17/581,957 with similar specification, filed Jan. 23, 2022, 38 pages, VMware, Inc.

* cited by examiner

*Primary Examiner* — Soe Hlaing
(74) *Attorney, Agent, or Firm* — Quarles & Brady LLP

(57) ABSTRACT

Some embodiments provide a method for providing access in a scalable manner to resources in a first datacenter to clients operating in one or more public clouds. The method of some embodiments implements with multiple machines a public-cloud proxy to connect clients in the public cloud(s) to a reverse proxy in the first datacenter. For instance, in response to a request to access a first resource in the first datacenter from a first client executing outside of the first datacenter, the method: (1) assigns a first proxy-implementing machine operating outside of the first datacenter to establish a first connection with the first client, (2) assigns a second proxy-implementing machine operating outside of the first datacenter to establish a second connection with the reverse proxy that operates in the first datacenter and that provides access to the first resource, and (3) establishes a third connection between the first and second proxy-implementing machines to forward messages between the first client and the reverse proxy through the first, second, and third connections.

18 Claims, 11 Drawing Sheets

PROVIDING ACCESS TO DATACENTER RESOURCES IN A SCALABLE MANNER

BACKGROUND

In recent years, enterprises have started to move some of their computer and network resources to the public clouds, while maintaining other resources in their private datacenters. This has resulted in a proliferation of the number of public clouds and the type of services offered by these clouds. This, in turn, has caused many enterprises to have several different deployments in several different clouds. Deployments across many different clouds offer many advantages, but increase the complexity of configuring the cloud resources access to on-premises resources in the private datacenters of enterprises.

BRIEF SUMMARY

Some embodiments provide a method for providing access in a scalable manner to resources in a first datacenter to clients operating in one or more public clouds. The method of some embodiments scalably implements with multiple machines a public-cloud proxy to connect clients in the public cloud(s) to a reverse proxy in the first datacenter. For instance, in response to a request to access a first resource in the first datacenter from a first client executing outside of the first datacenter, the method assigns a first proxy-implementing machine operating outside of the first datacenter to establish a first connection (e.g., a first layer 4 connection) with the first client. The method also assigns a second proxy-implementing machine operating outside of the first datacenter to establish a second connection (e.g., a second layer 4 connection) with the reverse proxy that operates in the first datacenter and that provides access to the first resource.

The method establishes a third connection (e.g., a third layer 4 connection) between the first and second proxy-implementing machines to forward messages between the first client and the reverse proxy through the first, second, and third connections. This third connection completes a three-way connection that links the first client and the reverse proxy. For purposes of brevity, this three-way connection is referred to below as a three-way connection link, even though this three-way connection is formed by three individual connections: one with the client and the first proxy-implementing machine, one between the reverse proxy and the second proxy-implementing machine, and one between the first and second proxy-implementing machines.

In some embodiments, the method uses the second proxy-implementing machine to establish several connections with the reverse proxy, with each of these connections handling communication between the reverse proxy and another client machine. For each of these other client machines, the method uses one proxy-implementing machine (e.g., the first proxy-implementing machine or another proxy-implementing machine) to establish a connection with the client machine, and then establishes a connection between this proxy-implementing machine and the second proxy-implementing machine to link the respective connections with the client and the reverse proxy (i.e., to establish a three-way connection link between the client and the reverse proxy).

The method in some embodiments monitors the number of connections assigned to the second proxy-implementing machine to determine whether this number has reached a threshold maximum number of connections. If so, the method assigns a third proxy-implementing machine operating outside of the first datacenter to handle new connections to the reverse proxy. For any new client connection, the method then establishes a connection between this third proxy-implementing machine (that connects to the reverse proxy) and the proxy-implementing machines that have a connection to the new client, in order to establish a three-way connection link that connects the client with the reverse proxy.

In some embodiments, the method creates separate three-way connection links for different connection sessions between one client and a reverse proxy. Also, some embodiments allow two different clients (e.g., two clients that are associated with one entity, such as one tenant or one company) to establish connections with the same proxy-implementing machine, while other embodiments limit each proxy-implementing machine to work with just one client.

Before establishing a connection between the reverse proxy and any proxy-implementing machine, the method of some embodiments establishes a control channel communication with the reverse proxy, and then uses this control channel communication, to subsequently inform the reverse proxy of a need to establish a datapath connection (e.g., in response to a client's request for a connection to the first datacenter). The method in some of these embodiments then assigns the second proxy-implementing machine to handle a connection with the reverse proxy, after receiving a request from the reverse proxy to establish a datapath connection with the public-cloud proxy.

To establish control channel communication with the reverse proxy, the method in some embodiments uses a fourth proxy-implementing machine to process control channel communications with the reverse proxy. In some embodiments, the first, second, third, and fourth proxy-implementing machines are Pods (e.g., Kubernetes Pods), while in other embodiments they are containers or virtual machines. Also, in some embodiments, the first, second, third, and fourth proxy-implementing machines operate in the same public cloud as the first client that is trying to access the first database. In other embodiments, these proxy-implementing machines operate in a different public cloud than the first client (e.g., operate in a public cloud of a different public cloud vendor, or operate in a public cloud of the same public cloud vendor but operating in a different geographic area or availability zone of the public cloud vendor than the first client).

The method of some embodiments is used to provide access to on-premises resources in a set of one or more private datacenters to clients operating in several public clouds that do not include these private datacenters. This method implements in the public cloud, a proxy to establish control channel communications with one or more on-premises reverse proxies deployed in the private datacenters. The method configures the proxy to validate authentication tokens provided by the on-premises reverse proxy and any public cloud client, which operates in any one of the plurality of public clouds and needs to access resources in the private datacenter that is accessible through the reverse proxies. The method forwards data messages between the reverse proxy and each particular client, after authenticating tokens of the reverse proxy and the particular client.

In some embodiments, the method receives an authentication token from a reverse proxy as part of a process for establishing control channel communications between the reverse proxy and the proxy. For instance, the method in some embodiments receives authentication credentials from the reverse proxy, examines the authentication credentials to authenticate the reverse proxy, and then supplies the authentication token to the client after authenticating the reverse proxy. Each authentication token includes a claim in some embodiments. The method in some embodiments examines the authentication token of the reverse proxy and the client by comparing the claims contained in their respective authentication token to ensure that these tokens belong to the same entity (e.g., to ensure that the claims match or are otherwise associated with the same entity). In some embodiments, a client provides its authentication request as part of its request to connect with a particular private datacenter.

In some embodiments, the authentication tokens are generated for the reverse proxy and any client by a cloud authentication service deployed in a public cloud. These authentication tokens are generated for the public-cloud proxy to use to ensure that the cloud clients should have access to the on-premises resources of the private datacenters that are protected by the reverse proxy. As mentioned above, in some embodiments, the public-cloud clients can operate in the same public cloud as the proxy, or in different public clouds as the proxy. Also, as mentioned above, some embodiments implement the public-cloud proxy with multiple sets of machines that establish three-way connection links between each client and each on-premises reverse proxy.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
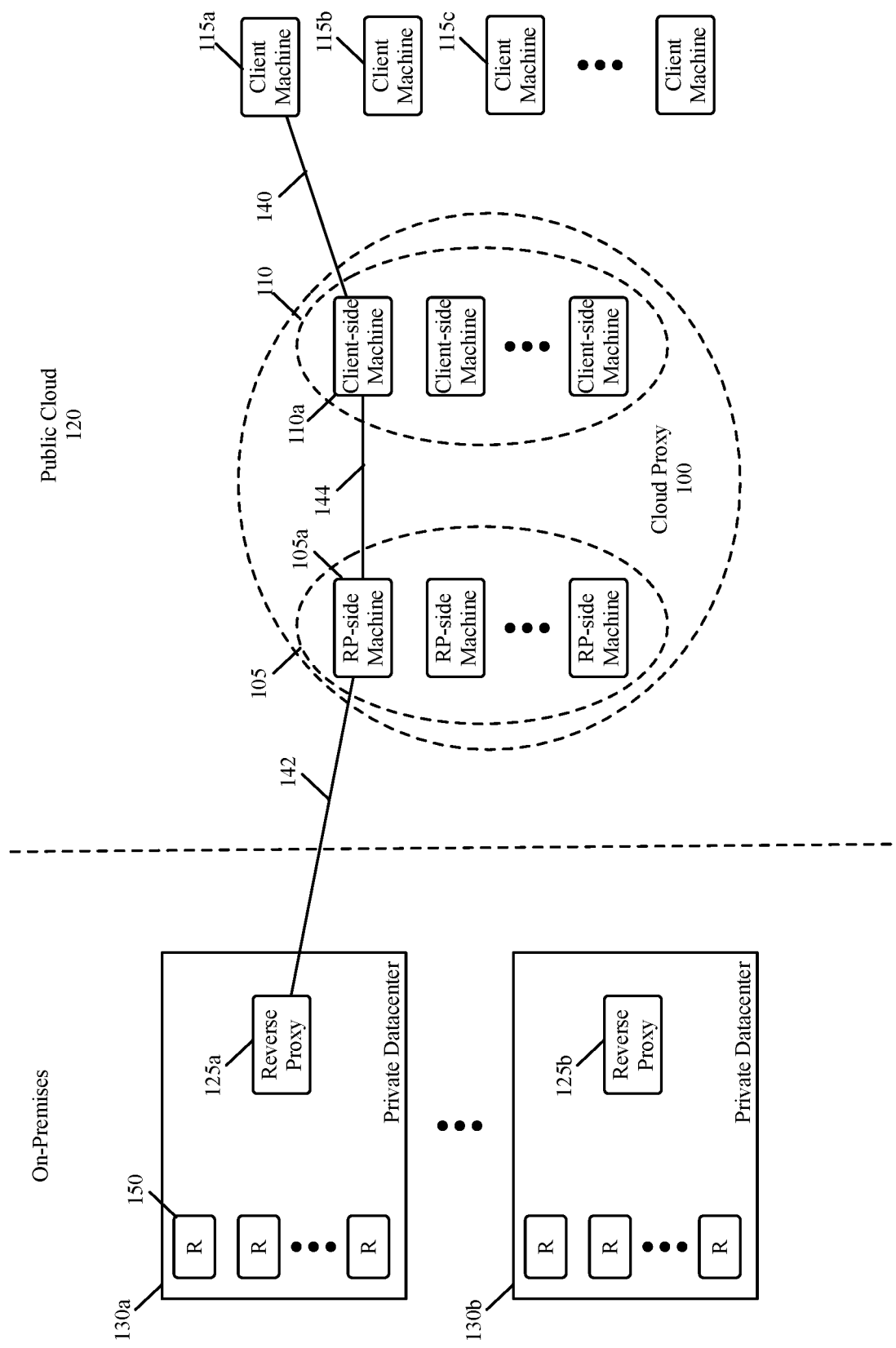
FIG. 1 illustrates an example of a public-cloud proxy being implemented by multiple machines deployed in the public cloud.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for providing access in a scalable manner to resources in a first datacenter to clients operating in one or more public clouds. The method of some embodiments scalably implements with multiple machines a public-cloud proxy to connect clients in the public cloud(s) to a reverse proxy (RP) in the first datacenter. For instance, in response to a request to access a first resource in the first datacenter from a first client executing outside of the first datacenter, the method assigns a first proxy-implementing machine operating outside of the first datacenter to establish a first connection (e.g., a first layer 4 connection) with the first client. The method also assigns a second proxy-implementing machine operating outside of the first datacenter to establish a second connection (e.g., a second layer 4 connection) with the reverse proxy that operates in the first datacenter and that provides access to the first resource.

The method establishes a third connection (e.g., a third layer 4 connection) between the first and second proxy-implementing machines to forward messages between the first client and the reverse proxy through the first, second, and third connections. This third connection completes a three-way connection that links the first client and the reverse proxy. For purposes of brevity, this three-way connection is referred to below as a three-way connection link, even though this three-way connection is formed by three individual connections: one with the client and the first proxy-implementing machine, one between the reverse proxy and the second proxy-implementing machine, and one between the first and second proxy-implementing machines.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, websocket frames, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Also, as used in this document, an entity can be any business entity (e.g., corporation, partnership, etc.), non-profit organization, educational entity, etc. A public cloud is a reference to compute and/or network hosting services offered by public cloud providers, such as Amazon Web Services, Google Cloud, Microsoft Azure, etc. Such public clouds are often formed by many datacenters in many geographic locations (e.g., cities, states, regions, countries, etc.). Some public cloud providers divide their public clouds into different availability zones in the same or different geographic locations.

A reverse proxy server is a process or server that typically operates behind a firewall in a private network and directs external client requests to the appropriate resource (e.g., backend server) of the private network. A reverse proxy provides an additional level of security to ensure that the external client requests meet the required security criteria for accessing the network's resource. A proxy is a process or server that allows multiple clients to route traffic to another network (e.g., allows multiple clients in a public cloud to access a private datacenter's network).

FIG. 1 illustrates an example of a public-cloud proxy 100 being implemented by multiple machines deployed in the public cloud 120. In this example, the proxy 100 is implemented in a public cloud 120 by two sets of machines, which are a RP-side set of machines 105 and a client-side set of machines 110. The public-cloud proxy 100 connects client machines 115 that are deployed for an entity in one or more public clouds to one or more reverse proxies 125 that are deployed in one or more private datacenters of the entity. Through these reverse proxies, the client machine can gain access to computer and/or network resources 150 of the entity that reside in the private datacenters.

Each client-side or RP-side machine 105 or 110 in some embodiments is a Pod, while in other embodiments each of these machines is a container or VM. In some embodiments, a machine can be either a client-side machine or a RP-side machine but not both. In other embodiments, a machine can be a client-side machine for some connections between the clients and the reverse proxies, and RP-side machine for other connections between the clients and the reverse proxies. As further described below, in the embodiments that allow one machine to handle both RP-side and client-side connections, the client- and RP-sides are two sub-processes of a larger process that operates within the machine that can act as both a client-side machine and an RP-side machine.

In FIG. 1, a three-way connection link is established to communicatively connect a client machine 115a, which is deployed for the entity in the public cloud 120, with a reverse proxy 125a in a private datacenter 130a of the entity, so that the client machine 115a can access the resource 150a. The three-way connection link is formed by a first L4 connection 140 between a client-side machine 110a and the client machine 115a, a second L4 connection 142 between a RP-side machine 105a and the reverse proxy 125a, and a third L4 connection 144 between the client-side machine 110a and the reverse-proxy side machine 105a.

Through these three separate L4 connections, the client machine 115a and the reverse proxy 125a can exchange data messages as part of the process used by the client machine 115a to gain access to computer and/or network resources in the private datacenter 130a that are protected by the reverse proxy 125a. In other embodiments, the three connections formed between RP-side and client-side machines (e.g., the three connections 140, 142, and 144) are L7 connections (e.g., are L7 web socket connections).

Also, assuming that the reverse proxy 125a does not reject the client machine's request to access the resource 150a, the reverse proxy 125a in some embodiments uses an L4 or L7 connection with the resource 150a to relay communication between the resource 150a and the client machine 125a. Accordingly, in these embodiments, there would be a four-way connection link formed between the resource 150a and the client machine 125a.

As mentioned above, some embodiments allow one machine to handle both client-side and RP-side connections. In some such embodiments, the client- and RP-sides are two sub-processes of a larger process that operates within the machine that can act as both a client-side machine and an RP-side machine. In some such embodiments, the two sub-processes can establish a three-way connection link between a reverse proxy and a client machine. When operating in this manner, the two sub-processes in some embodiments do not set up a connection session between them to connect the client-side subprocess to the RP-side subprocess but rather communicate with each other through shared memory.

In these embodiments, the client-side subprocess of a first machine would set up a connection session with an RP-side subprocess of another machine to establish a three-way connection between a reverse proxy and first client machine. Similarly, in these embodiments, the RP-side subprocess of the first machine would set up a connection session with a client-side subprocess of another machine to establish a three-way connection between a reverse proxy and a client machine. Accordingly, in these embodiments, the three-way connection links established with separate RP-side and client-side machines are formed by three separate L4 or L7 connections, while three-way connection links established with one machine operating both the RP-side and client-side connections are formed by just two L4 and L7 connections and one shared memory connection.

Figure 2:
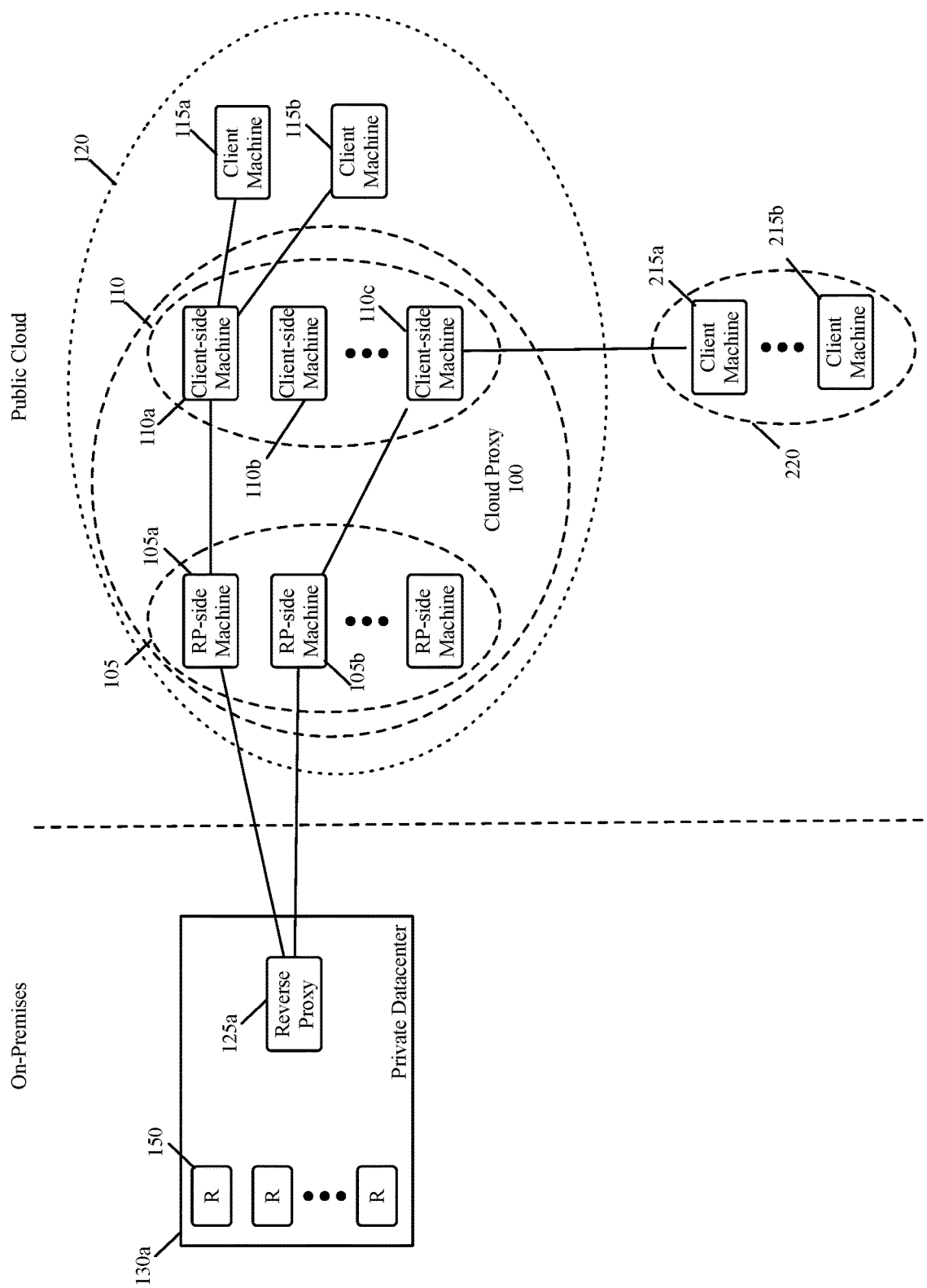
FIG. 2 illustrates an example in which some of the client machines are in a different public cloud than the proxy-implementing machines.

In FIG. 1, the client machines 115 are in the same public cloud as RP-side and client-side machines 105 and 110 that implement the public-cloud proxy 100. In other embodiments, some or all of the client machines are in different public clouds than the proxy-implementing machines 105 and 110. FIG. 2 illustrates an example in which some of the client machines (e.g., machine 215) are in a different public cloud 220 than the proxy-implementing machines 105 and 110. The proxy-implementing machines and the client machines in some embodiments can also be in different datacenters or availability zones of the same public cloud.

FIG. 2 also shows the reverse proxy 125a having multiple L4 connections with multiple RP-side machines 105 of the proxy 100. In this example, the reverse proxy 125a has two L4 connections with RP-side machine 105a to establish two three-way connection links to clients 115a and 115b, and one L4 connection with RP-side machine 105b for one three-way connection link to client 215a through client-side machine 110C. As illustrated by these examples, each RP-side machine of the proxy 100 can establish several connections with one or more reverse proxies, with each of these connections handling a connection session between the reverse proxy and another client machine.

For each client machine, the proxy uses one client-side proxy machine to establish a connection with the client machine, and then establishes a connection between this proxy-implementing machine and the second proxy-implementing machine to link the respective connections with the client and the reverse proxy (i.e., to establish a three-way connection link between the client and the reverse proxy). In FIG. 2, clients 115a and 115b establish connections with client-side machine 110a, while client 215a establishes a connection with client-side machine 110c. In this example, the reverse proxy 125a establishes three separate connections with RS-side machine 105*a* to process the communication with the three client machines 115*a*, 115*b*, and 215*a*.

As shown by these examples, some embodiments allow two different clients (e.g., two clients that are associated with one entity, such as one tenant or one company) to establish connections with the same client-side machine. Other embodiments limit each client-side machine to work with just one client. Also, some embodiments limit each client-side machine to work with just one or more client machines of one entity, while other embodiments allow a client-side machine to work with the machines of more than one entity (i.e., have client-side machines that can handle multi-tenancy).

Figure 3:
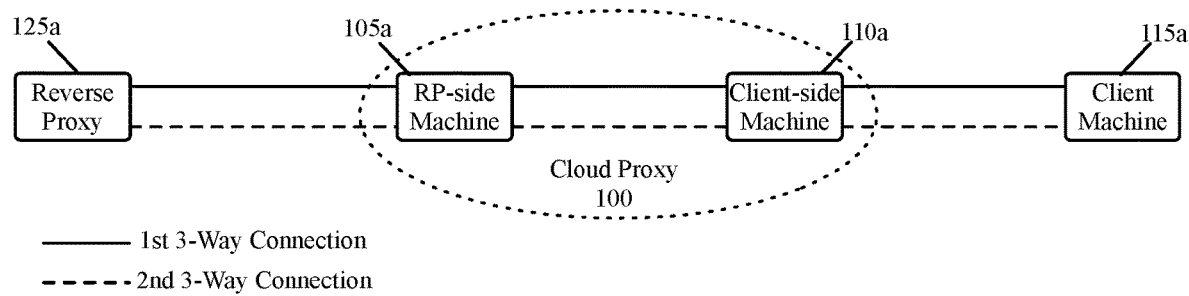
FIG. 3 illustrates an example that shows two three-way connections between client machine and reverse proxy for two different connection sessions between the client machine and the reverse proxy.

Some embodiments establish multiple three-way connection links between one client machine and one reverse proxy to handle multiple connection sessions between the client machine and the reverse proxy. FIG. 3 illustrates an example that shows two three-way connections (one depicted with a set of three solid lines, and the other depicted with a set of three dashed lines) between client machine 115*a* and reverse proxy 125*a* for two different connection sessions between the client machine 115*a* and the reverse proxy 125*a*. This is because each three-way connection link in some embodiments is dedicated to just one connection session in some embodiments.

In this example, both three-way connection links are established by the same pair of RP-side and client-side machines 105*a* and 110*a* but this does not have to be the case in some embodiments (i.e., different pairs of RP-side and client-side machines can implement different three-way connections between one client machine and one reverse proxy). Other embodiments only establish one three-way connection link for each pair of client machine and reverse proxy, and use this three-way connection link for all connection sessions between these two endpoints.

Each RP-side proxy machine in some embodiments can handle a certain number of connections with one or more reverse proxies. Hence, some embodiments monitor the number of connections assigned to one RP-side proxy machine to determine whether this number has reached a threshold maximum number of connections. If so, these embodiments assign new connections to another RP-side proxy machine.

Figure 4:
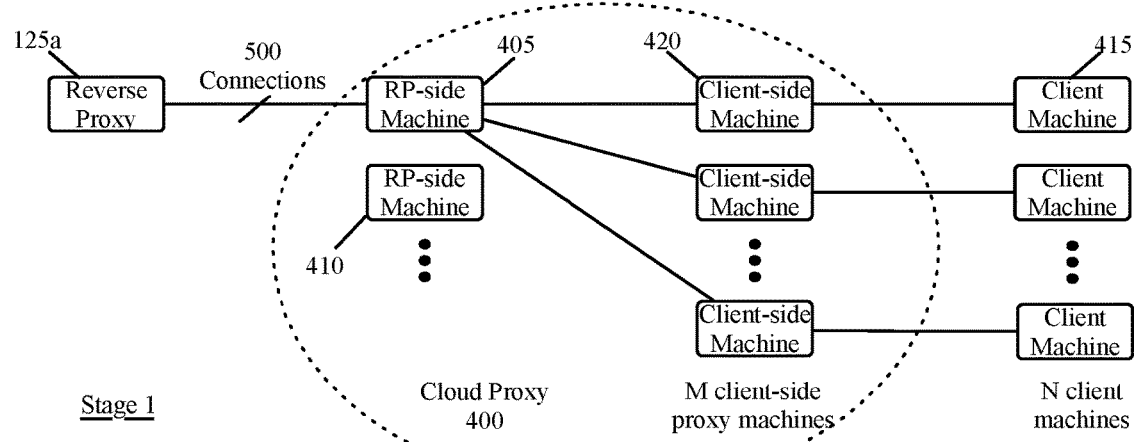
FIG. 4 illustrates an example of assigning new connections to a second RP-side proxy machine after a first RP-side proxy machine has reached its threshold.
Figure 4:
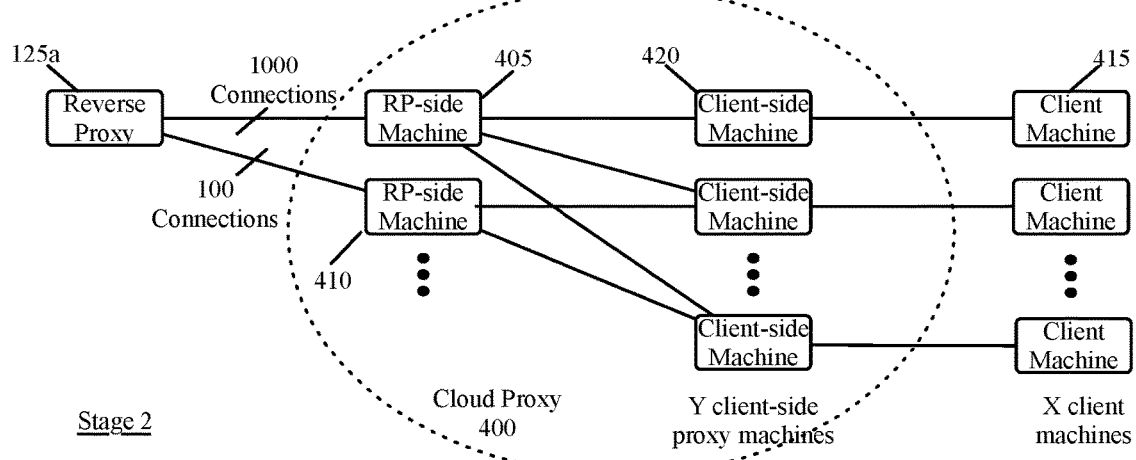

FIG. 4 illustrates an example of assigning new connections to a second RP-side proxy machine 410 after a first RP-side proxy machine 405 has reached its threshold. This example is illustrated in two stages. In the first stage, the first RP-side proxy machine 405 is processing 500 connections to two reverse proxies that are from N client machines 415 through M client-side proxy machines 420. The second stage then shows after the first RP-side proxy machine 405 has reached it threshold 1000 connections, the second RP-side proxy machine 410 is used to process another 100 connections, so that the proxy 400 can process 1100 connections in total from X client machines 435 through Y client-side proxy machines 440.

It should be noted that in some embodiments existing RP-side proxy machines need to be close to their threshold number of connections before new RP-side proxy machines are used to process new connections. In some embodiments, these other new RP-side proxy machines are instantiated long before they are assigned new connections, while in other embodiments, these new RP-side proxy machines are instantiated on-demand when the existing RP-side proxy machines are nearing their threshold number of connections. Other embodiments, however, instantiate and use multiple RP-side proxy machines long before any one RP-side proxy machine reaches its threshold number of connections. For instance, in these embodiments, when the existing RP-side proxy machines reach P % (e.g., 50%) of their connections, some embodiments start using previously deployed or newly deployed RP-side proxy machines for some of the newer connections.

Each client-side proxy machine in some embodiments can also handle a certain number of connections with one or more client machines. Hence, like RP-side proxy machines, some embodiments monitor the number of connections assigned to a client-side proxy machine to determine whether this number has reached a threshold maximum number of connections. If so, these embodiments assign new connections to other client-side proxy machines and/or deploy new client-side proxy machines to handle the increasing connection load.

Figure 5:
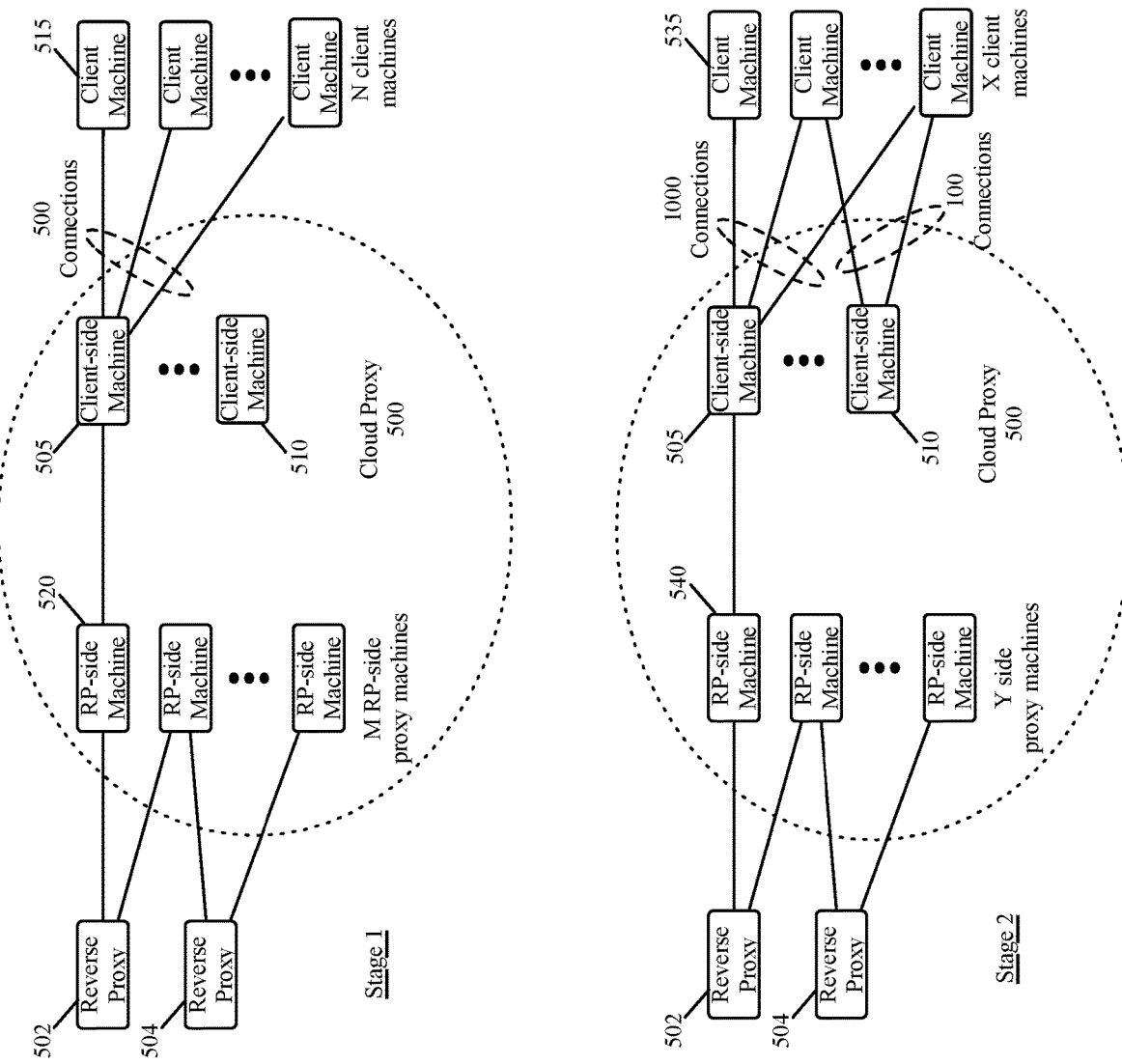
FIG. 5 illustrates an example of assigning new connections to a second client-side proxy machine after a first client-side proxy machine has reached its threshold.

FIG. 5 illustrates an example of assigning new connections to a second client-side proxy machine 505 of a cloud proxy 500 after a first client-side proxy machine 505 has reached its threshold. This example is illustrated in two stages. In the first stage, the first client-side proxy machine 505 is processing 500 connections from N client machines 515 to two reverse proxies 502 and 504 through M RP-side proxy machines 520. The second stage then shows after the first client-side proxy machine 505 has reached it threshold 1000 connections, the second client-side proxy machine 510 being used to process another 100 connections, so that the proxy 500 can process 1100 connections in total from X client machines 535 through Y RP-side proxy machines 540.

In some embodiments as described by the examples above, the load on each proxy-implementing machine (either RP-side or client-side) is measured in terms of the number of connections processed by the machine. One of ordinary skill will realize that other embodiments quantify the load on each proxy-implementing machine in other ways, e.g., based on the number of bytes processed, the sizes of the flows processed, the amount of the compute resources (e.g., processor, memory, storage) or network resources (e.g., network bandwidth) by each proxy-implementing machine. Based on these other load metrics, these embodiments then deploy and/or use new proxy-implementing machines to alleviate the load on existing machines.

The above-described embodiments scale up the public cloud proxy's machines by deploying and/or using new proxy-implementing machines to handle increasing demand from client machines. These embodiments also scale down the public cloud proxy's machines when the demand from client machines decreases. For instance, as the number of requested connections to on-premises resources falls, some embodiments start assigning new connections to smaller groups of RP-side proxy machines and/or client-side proxy machines, so that some of the proxy machines are not being utilized and can be de-allocated or put in standby mode.

Figure 6:
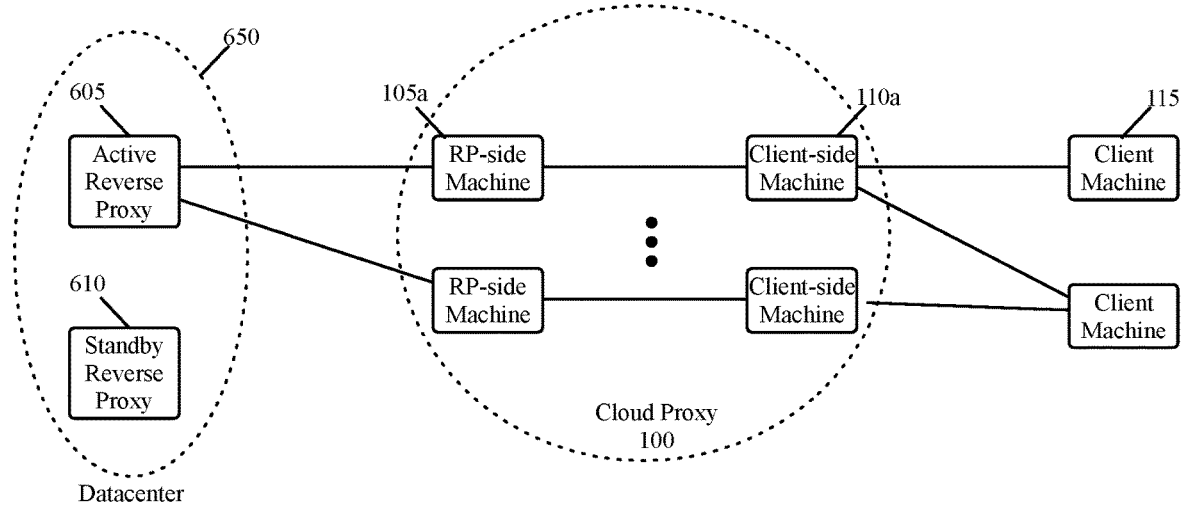
FIGS. 6 and 7 illustrate one high availability scheme for having reverse proxies in a datacenter.
Figure 7:
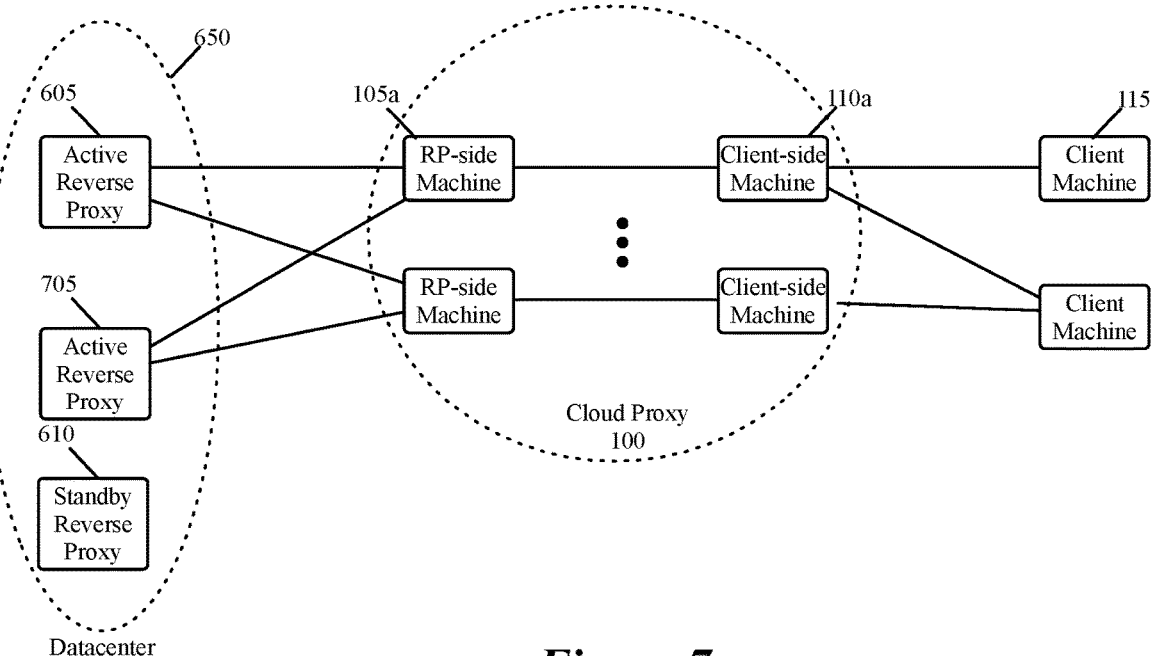

Some embodiments also scale up or down the number of on-premises reverse proxies in a private datacenter as demand for connections to on-premises resources increases or decreases from the offsite client machines (e.g., client machines in the cloud). FIG. 6 illustrates that in some embodiments a private datacenter 650 starts with two reverse proxies with one reverse proxy 605 in an active mode and the other reverse proxy 610 in standby mode in case the active one fails. FIG. 7 illustrates that as the number of connections increases, a third reverse proxy 705 is added in an active mode. In this example, the number of standby reverse proxies is not increased. However, in some embodiments, for every N active mode reverse proxy (where N is an integer, e.g., two or three) that is added, one new standby reverse proxy is also added.

Figure 8:
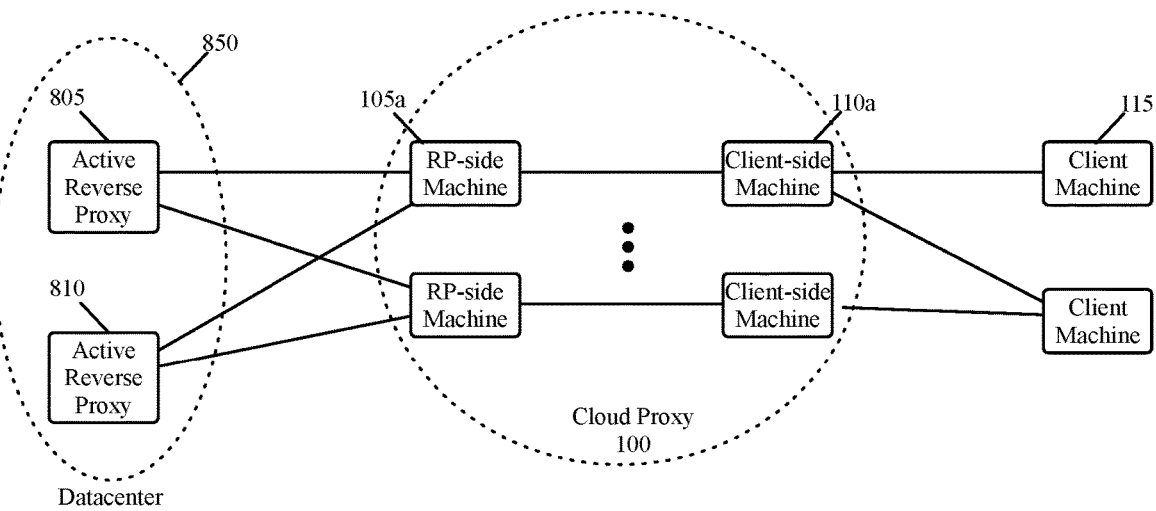
FIGS. 8 and 9 illustrate one high availability scheme for having reverse proxies in a datacenter.
Figure 9:
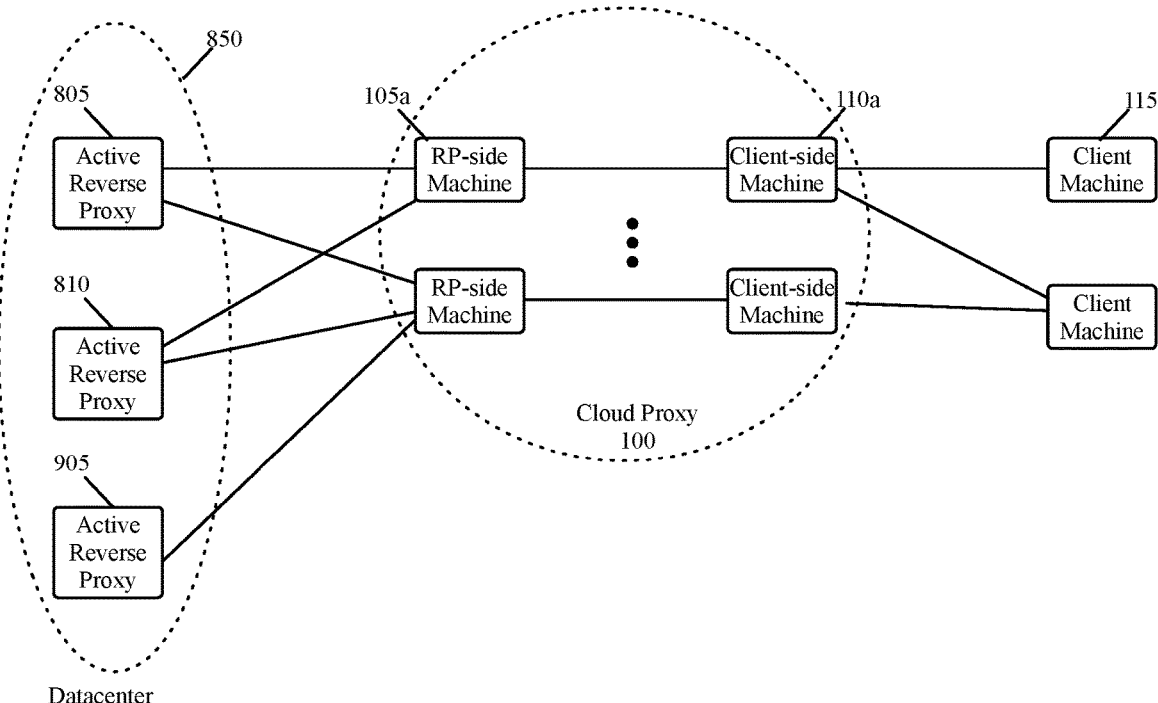

FIGS. 8-9 illustrate another scheme used by some embodiments for managing on-premises reverse proxies. FIG. 8 illustrates that in some embodiments a private datacenter 850 starts with two reverse proxies 805 and 810 both of which are in active mode to handle a certain number of connections for offsite client machine access to on-premises resources. FIG. 9 illustrates that as the number of connections increases, a third reverse proxy 905 is added in an active mode.

When a private datacenter has multiple reverse proxies operating in active mode, the public-cloud proxy in some embodiments uses one of several load-balancing techniques to distribute the load (from offsite client machines trying to gain access to on-premises resources of the datacenter) among the active reverse proxies. For instance, the public-cloud proxy uses a round-robin approach to distribute the load among the active reverse proxies. In some embodiments, this round-robin approach is an unweighted approach (where each reverse proxy is assigned the same number of new connections).

Other embodiments, however, use a weighted round-robin approach, where each active reverse proxy is assigned new connections according to a weight value. For instance, when a datacenter has three active reverse proxies with weights of 3, 3, 4, each set of 10 new connections are assigned 3 to the first reverse proxy, 3 to the second reverse proxy and 4 to the third reverse proxy, with the assignment of the next new connections starting back at the first reverse proxy. The weight values in some embodiments are derived from real-time or near real-time statistics that are collected from the active reverse proxies. Examples of such statistics include number of connections, sizes of active flows, numbers of bytes processed, etc.

Figure 10:
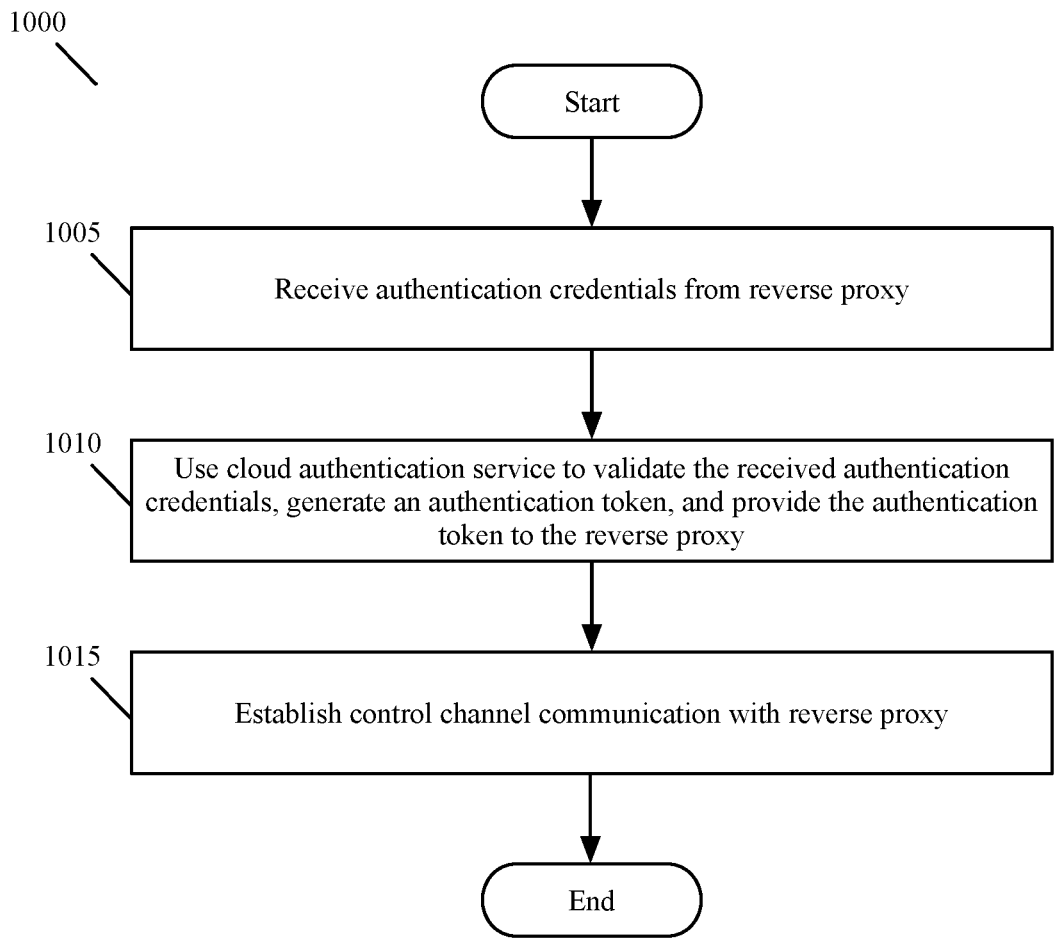
FIGS. 10 and 11 illustrate two processes performed by the cloud proxy of some embodiments to allow client machines to access on-premises resources of a private datacenter through a reverse proxy of the datacenter.
Figure 11:
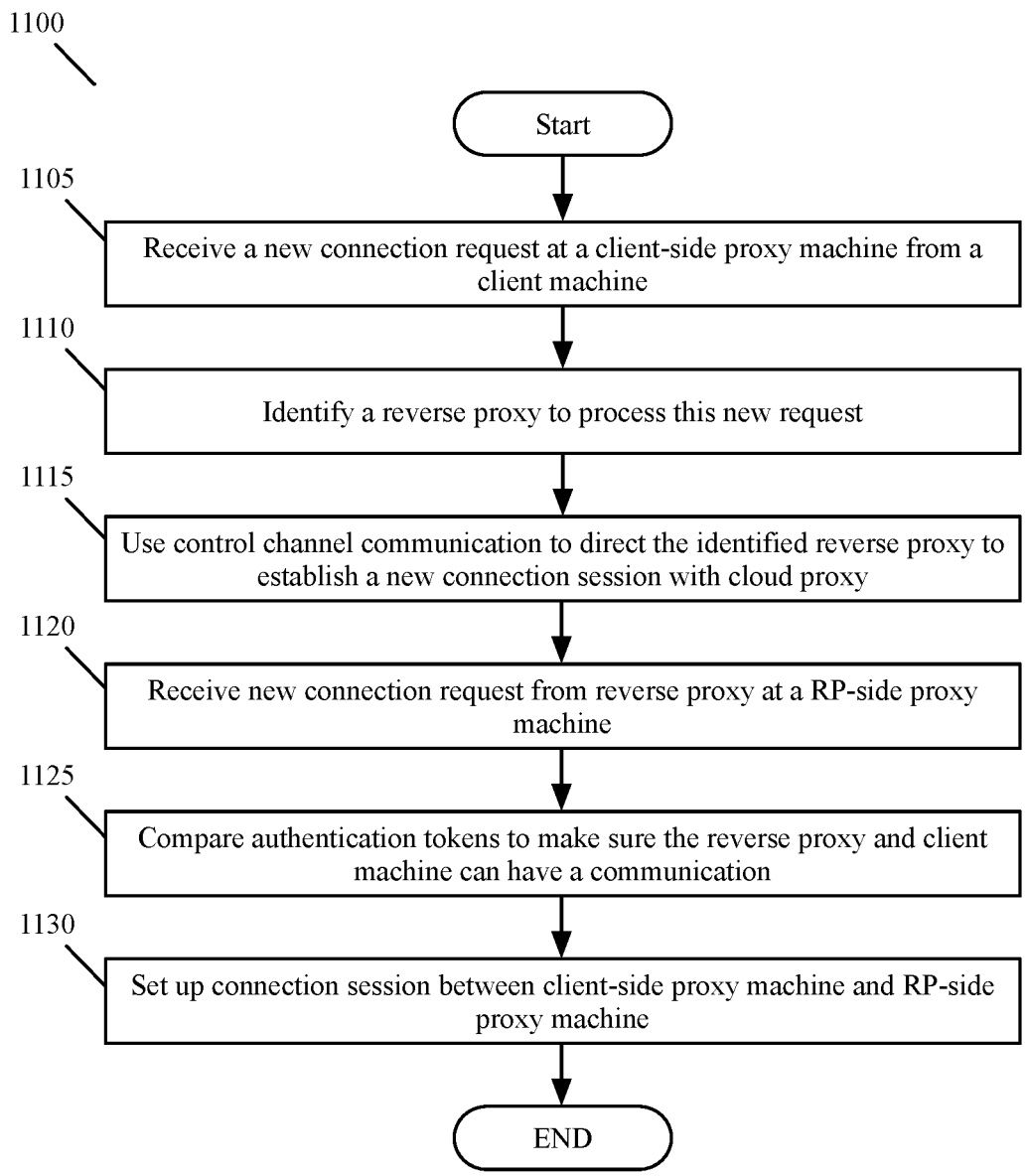

FIGS. 10 and 11 illustrate two processes 1000 and 1100 performed by the cloud proxy (e.g., cloud proxy 100) of some embodiments to allow client machines to access on-premises resources of a private datacenter through a reverse proxy (e.g., an on-premises reverse proxy) of the datacenter. The process 1000 of FIG. 10 establishes a control channel communication with the reverse proxy that the process 1100 of FIG. 11 then uses to establish a three-way connection link between the reverse proxy and a client machine.

The process 1000 is performed as part of the provisioning of a reverse proxy. Once the reverse proxy has been deployed in a private datacenter, it has to register with the cloud proxy to let the cloud proxy know that the reverse proxy is available for handling new connection requests from the client machine. In some embodiments, only active reverse proxies perform the process 1000, while in other embodiments both active and standby proxies perform this process (e.g., in some embodiments, the cloud proxy is responsible for monitoring the health status of the reverse proxies, and for directing a standby reverse proxy to become an active reverse proxy after detecting failure of an active reverse proxy).

As shown in FIG. 10, the process 1000 initially receives (at 1005) the authentication credentials of the reverse proxy. It then (at 1010) uses a cloud authentication service to validate the received authentication credentials, generates an authentication token, and provides the authentication token to the reverse proxy to use to authenticate itself for subsequently established three-way connection links with client machines. Instead of an authentication token, the process 1000 generates a token (such as a UUID), which it provides to the reverse proxy to use in subsequent communications to establish three-way connection links.

Next, at 1015, the process 1000 establishes a control channel communication with the reverse proxy. Through this control channel, the cloud proxy subsequently sends notifications to the reverse proxy to set up individual connection sessions with RP-side proxy machines of the cloud proxy, in order to set up individual three-way connection links between the reverse proxy and the client machines. After 1015, the process 1000 ends. As mentioned above, the entire process 1000 in some embodiments is performed by the cloud proxy. In other embodiments, however, the operations 1005 and 1010 are provided by the cloud authentication service, while the operation 1015 is performed by the cloud proxy.

The cloud proxy of some embodiments performs the process 1100 of FIG. 11 each time it receives a new request from a cloud client machine to connect to an on-premises resource that is protected by a reverse proxy of the private datacenter. As shown, the process 1100 initially receives (at 1105) a new connection request (from a cloud client machine) at a client-side proxy machine of the cloud proxy. This connection request is received through an L4 or L7 connection between the client machine and the client-side proxy machine in some embodiments.

The process 1100 then selects (at 1110) a reverse proxy to receive this new connection request. This selection entails identifying the candidate reverse proxies that are available to handle this request for a particular on-premises resource that is the target of the request, and then select one of the candidate reverse proxies when there is more than one candidate available (e.g., use a weighted round-robin process to select the reverse proxy from several candidate reverse proxies).

Next, at 1115, the process 1100 uses the control communication channel that the cloud proxy previously established with the reverse proxy selected at 1110, to inform this reverse proxy to establish a new connection session with the cloud proxy for the new connection request. At 1120, the process 1100 then receives, at an RP-side proxy machine, the new connection session request from the identified reverse proxy. In some embodiments, the reverse proxy's connection request can go to any RP-side proxy machine, while in other embodiments, the cloud proxy directs the reverse proxy to connect to just one RP-side proxy machine or one cluster of RP-side proxy machines for all of its connections until the cloud proxy directs the reverse proxy to connect to another RP-side proxy machine for another batch of its connections.

When the client machine and the reverse proxy establish connection sessions with the client-side and RP-side proxy machines, the client machine and the reverse proxy provide authentication tokens that they received from the cloud authentication service. At 1125, the process 1100 analyzes these tokens to ensure that they match (e.g. that they are identical or are otherwise compatible or mutually verifiable tokens associated with each other and/or with one common entity), in order to make sure that the client machine and the reverse proxy can communicate. When the tokens do not match, the process 1100 terminates.

On the other hand, assuming that the tokens match, the process 1100 then sets up (at 1130) a connection session between the client-side proxy machine that is handling the client machine's new connection request, and the RP-side proxy machine that is handling the connection session with the reverse proxy for the requested client machine connection. To identify the client-side proxy machine to connect an RP-side proxy machine that receives a new connection request from a reverse proxy, the RP-side proxy machine or another module of the cloud proxy uses the UUID provided in the reverse proxy's connection request to identify a matching UUID in a database that identifies the client-side proxy machine associated with that UUID. In some embodiments, this UUID is provided by the cloud proxy through its control channel communication with the reverse proxy that directs the reverse proxy to set up a new datapath connection with the cloud proxy to handle a new connection session with a client machine.

Once this connection session is established between these two proxy machines, the process 1100 then uses the three-way connection link between the client machine and the reverse proxy to forward data messages between these two endpoints. After 1135, the process 1100 ends when the client machine is finished using the requested connection or when the reverse proxy terminates this connection.

Figure 12:
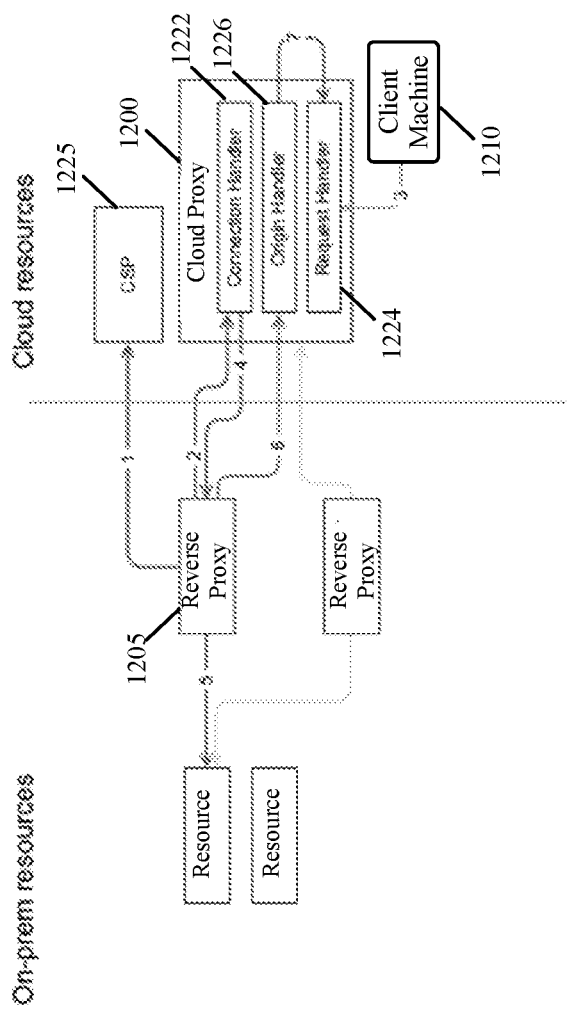
FIG. 12 illustrates a more detailed example of the cloud proxy operation in some embodiments of the invention.

FIG. 12 illustrates a more detailed example of some embodiments of the invention. In this example, the cloud proxy 1200 allows Kubernetes® client machines to gain access to on-premises resources in a private datacenter through a reverse proxy 1205. In some embodiments, the cloud proxy 1200 has an external IP but the reverse proxy 1205 does not. The cloud portion of the service is highly available and scalable, and is intended to be able to handle thousands of individual connections.

Some embodiments expose the reverse proxy 1205 with a single external IP address. The reverse proxy 1205 connects to the cloud proxy 1200 using HTTPS (and secure web sockets) to register endpoints that it can service. In order to connect, the reverse proxy 1205 in some embodiments uses the CSP authorization service 1225 of VMware, Inc. This authorization service uses OAuth tokens with adequate privileges. In some embodiments, the reverse proxy 1205 has configuration files, and all incoming connections are validated against the configuration, which can be used to describe both allow- and deny-listing mechanisms for the cloud client machines 1210 accessing on-premises resources. In some embodiments, multiple reverse proxies can operate in a datacenter, and if they use the same reverse proxy token, the load will be divided across them to increase both scalability and availability.

FIG. 12 depicts a data flow between a client machine 1210, various components of the cloud proxy 1200, and the reverse proxy 1205. As shown, the initial operation after the deployment of the reverse proxy 1205 behind the private datacenter's firewall, is for an administrator to set up an CSP service-token for the reverse proxy 1205 by using the CSP authentication service 1225. By default, the reverse proxy can be configured by the cloud service to any service reachable by the reverse proxy, but this can be disabled and an explicit allow list enabled (for security purposes). In some embodiments, each private datacenter or site will have a unique service token. When two reverse proxies are used in one datacenter or site, some embodiments use the same service token for both reverse proxies in order to operate the reverse proxies in an HA mode.

As shown in FIG. 12, the reverse proxy 1205 uses the service token obtained from the CSP service 1225 to initiate a bi-directional control channel connection with the cloud proxy 1200. To establish this channel, the connection request will verify the JWT access token. The connection in some embodiments is a secure web socket or an SSL-secured TCP connection created through HTTP CONNECT. As shown, a connection-handling Pod 1222 terminates this connection, and this Pod 1222 will write the connection status to a database.

To begin a remote connection, the cloud client machine 1210 (e.g., a Pod) makes a call to a resource in the datacenter, and specifies the transporter service as an HTTP proxy. This call lands on a request-handling Pod 1224, which converts the HTTP connection to a raw socket (request-socket). The request-handling Pod 1224 in some embodiments has to identify the reverse proxy for the received request. When multiple candidate reverse proxies exist, this identification entails selection of one of the candidate reverse proxies, e.g., selecting the reverse proxy with the fewest current connections (counting both in-progress and active). The request-handling Pod 1224 creates a new connection UUID (universally unique identifier), which will be used as a shared secret, since it will be hard to guess this identifier.

The request-handling Pod 1224 also selects a port that will listen for a gateway connection (gateway-socket) for the third connection in the three-way connection link that is established after the reverse proxy establishes its connection with the cloud proxy. After the request handler performs these operations, the request-handling Pod will write an event to the database in order to request a new connection be established between the origin-handling Pod 1226 and the reverse proxy 1205.

The connection-handling Pod 1222 then receives notification of this event from the database (e.g., based on previously registering for such notifications), and in response, sends an event notification over the control communication channel to the reverse proxy 1205 to establish a datapath connection with the cloud proxy 1200 (i.e., with the origin-handling Pod 1226) for accessing a particular resource in the datacenter. The connection handler 1222 then updates the database event with the state after sending the request to the reverse proxy 1205. Instead of using the database as a communication mechanism between the different components of the cloud proxy, other embodiments use other communication mechanisms between these components.

The reverse proxy 1205 then creates a TCP connection to the requested datacenter resource (e.g. vSphere). Errors will be returned if the DNS name cannot be resolved, or the connection is refused. The reverse proxy 1205 then starts a new HTTP CONNECT call to the cloud proxy 1200 with the connection UUID in the URL. The origin-handling Pod 1226 then verifies that the JWT access tokens of the reverse proxy 1205 and the client machine 1210 match. The origin-handling Pod 1226 then converts the HTTP connection to a raw socket (origin-socket). The origin handler 1226 then updates the database event with a reference to the pod IP address as the origin-side handler. The reverse proxy 1205 splices (i.e., associates) the two sockets together once they are connected (resource-socket and origin-socket).

The origin handler 1226 next opens a TCP socket to the request handler 1224 (gateway-socket). The request handler 1224 then accepts the connection, and splices (i.e., associates) the gateway-socket and the request-socket. The origin handler 1224 then splices (i.e., associates) the gateway-socket and the origin-socket. The extra hop between these two handlers 1224 and 1226 adds complexity, but very little overhead. It also isolates the initiator from the reverse proxy connection, and allows the service to forego interacting with a load balancer. Other embodiments use other techniques to associate the various connections between the components.

Once the three-way connection link is established, the client machine 1210 connects to the on-premises resource via a secure channel (e.g., SSL), and responses happen on the same channel in the other direction, in some embodiments. In these embodiments, all of the sockets pass uninterpreted bytes, and the SSL connection is terminated at the end.

The cloud proxy 1200 of FIG. 12 also has other components not shown in this figure. For instance, in some embodiments, the cloud proxy 1200 has one or more Pods for monitoring the load on its RP-side Pods (i.e., its origin handlers) and its client-side Pods (i.e., on its request handlers), in order to allocate new Pods to perform the RP-side and client-side connections as the connection load increases, and to deallocate (i.e., decommission or remove) Pods from the RP-side and client-side pool of Pods as the connection load decreases. In other embodiments, the connection handler 1222 is the Pod that does this monitoring and allocating/de-allocating. In still other embodiments, the connection handler 1222 does the monitoring but another cloud proxy Pod does the allocating/deallocating. In some embodiments, the cloud proxy Pods also monitor the load on the reverse proxies, and when needed direct the private datacenters to add or remove the reverse proxies. In other embodiments, the scaling up or down of the reverse proxies are the responsibilities of the network managers of the private datacenters.

Figure 13:
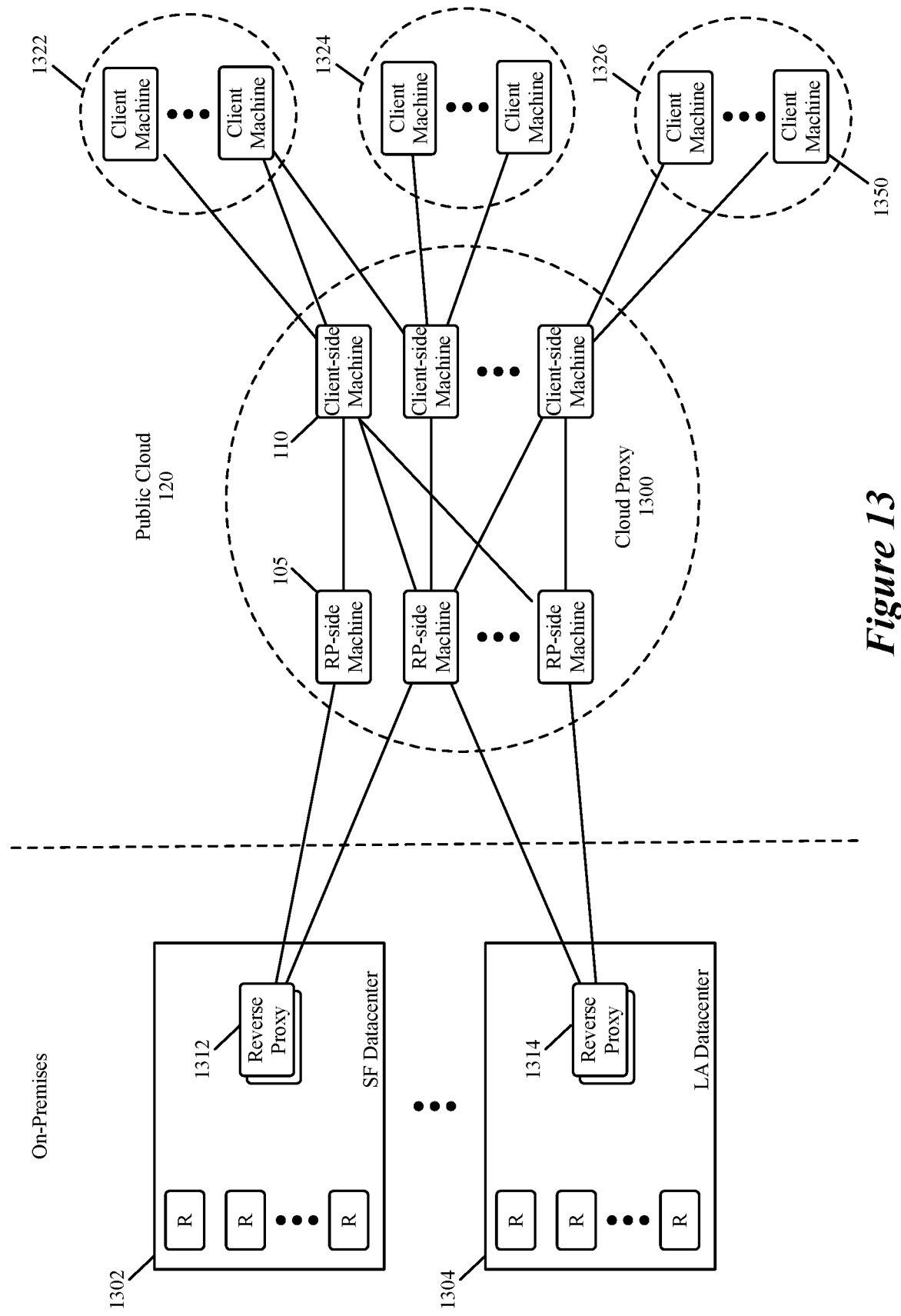
FIG. 13 illustrates that some embodiments are used to provide access to resources in multiple on-premises datacenters to clients operating in multiple public clouds.

Some embodiments are used to provide access to resources in multiple on-premises datacenters to clients operating in multiple public clouds (which do not include the on-premises datacenters). FIG. 13 illustrates an example in which the cloud proxy 1300 (e.g., the proxy 100 or 1200) connects the on-premises resources of an entity in two of its private datacenters 1302 and 1304 in San Francisco and Los Angeles through their respective sets of reverse proxies 1312 and 1314 to cloud client machines 1350 of the entity that are deployed in three public clouds 1322, 1324, and 1326. The RP-side and client-side machines 105 and 110 of the cloud proxy 1300 in some embodiments are in one of the three public clouds 1322-26, while in other embodiments they are in two or more of these public clouds, and still other embodiments are in other public cloud(s).

The proxy and reverse-proxy architecture of some embodiments is ideal for offering cloud to on-prem connectivity as proxy-implementing machines and reverse proxies can easily be added or removed to scale up or down the cloud proxy and the reverse proxies as the number of connections from the cloud to on-premises resources increases or decreases. Through the use of the CSP tokens, this architecture also provides the needed security for ensuring that three-way connection links can be formed between client machines and reverse proxies.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
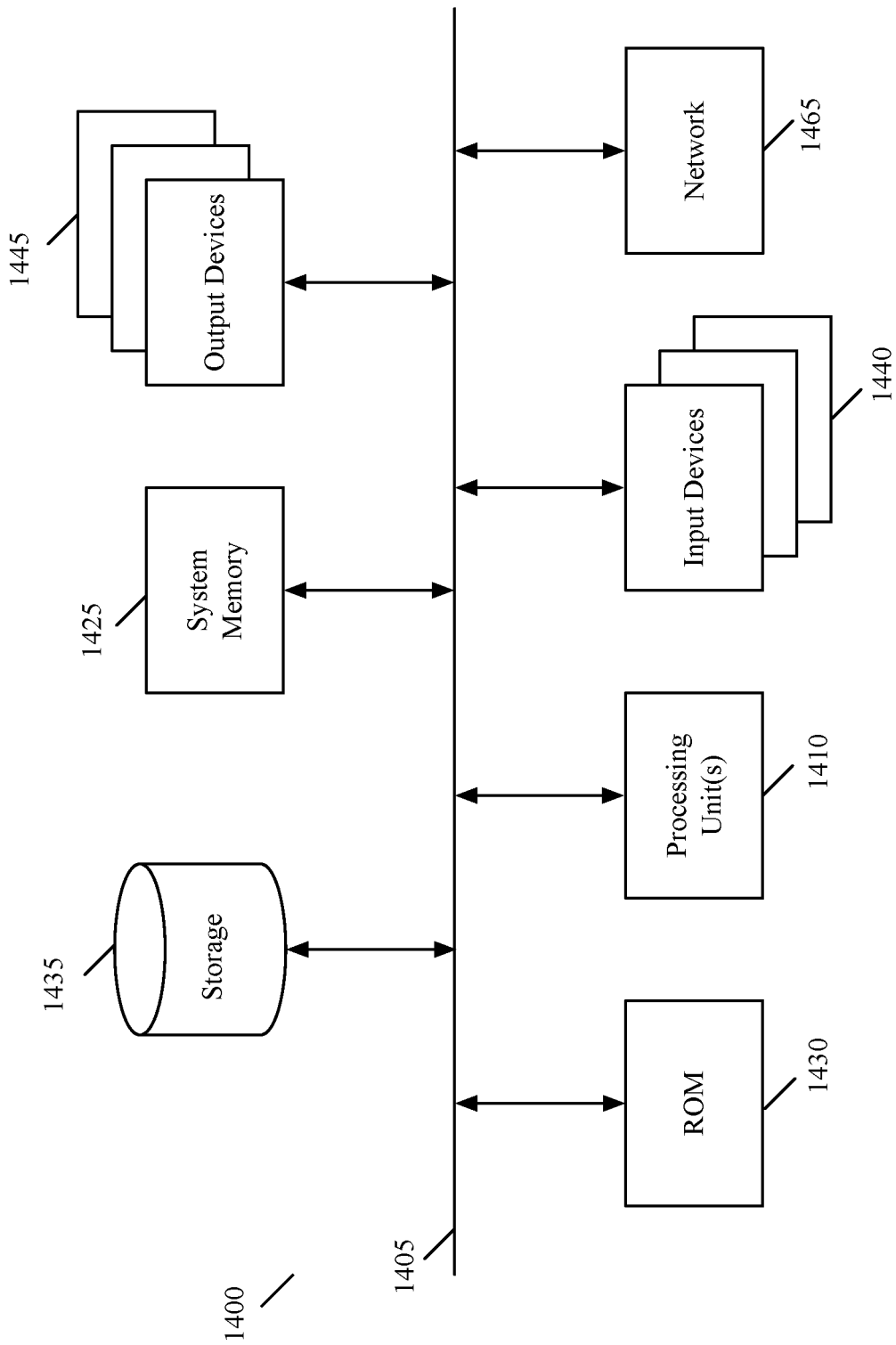
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described computers and servers. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several embodiments were described above for allowing an entities cloud machines to access on-premise resources in private datacenters. However, the above-described cloud proxy architecture is used in some embodiments to allow machines in one private datacenter (e.g., of one entity) to access resources in one or more other private datacenters (e.g., of the same entity). Thus, one of ordinary skill in the art would understand that the invention is not to be limited by the foregoing illustrative details, but rather is to be defined by the appended claims.

The invention claimed is:

1. A method for providing in a scalable manner access to resources in a first datacenter to clients operating in one or more public clouds, the method comprising:
    establishing control channel communication with a reverse proxy;
    receiving a request to access a first resource in the first datacenter from a first client executing outside of the first datacenter;
    through the control channel communication, informing the reverse proxy of the request;
    receiving a second request from the reverse proxy for a datapath connection;
    assigning a first proxy-implementing machine operating outside of the first datacenter to establish a first connection with the first client;
    assigning a second proxy-implementing machine, in response the reverse proxy's request, operating outside of the first datacenter to establish a second connection with the reverse proxy that operates in the first datacenter and that provides access to the first resource;
    establishing a third connection between the first and second proxy-implementing machines to forward messages between the first client and the reverse proxy through the first, second, and third connections.

2. The method of claim 1 further comprising:
    assigning the second proxy-implementing machine to establish a plurality of connections with the reverse proxy;
    establishing a first plurality of connections between the second proxy-implementing machine and each of a set of other proxy-implementing machines that have connections with a first set of other client machines, the established first plurality of connections to forward messages between each client in the first set and the reverse proxy.

3. The method of claim 2 further comprising:
    detecting that the second proxy-implementing machine has reached a threshold number of maximum connections;
    assigning a third proxy-implementing machine operating outside of the first datacenter to establish a fourth connection with the reverse proxy;
    establishing a second plurality of connections between the third proxy-implementing machine and each of a second set of other proxy-implementing machines that have connections with a second set of other client machines, the established second plurality of connections to forward messages between each client in the second set and the reverse proxy.

4. The method of claim 1 further comprising:
    assigning the first proxy-implementing machine to establish a fourth connection with a second client that operates outside of the first datacenter and that wants access to a second resource in the first datacenter;
    assigning the second proxy-implementing machine to establish a fifth connection with the reverse proxy to provide access to the second resource;
    establishing a sixth connection between the first and second proxy-implementing machines to forward messages between the second client and the reverse proxy through the fourth, fifth, and sixth connections.

5. The method of claim 1 further comprising:
    assigning the fourth proxy-implementing machine to establish a fourth connection with a second client that operates outside of the first datacenter and that wants access to a second resource in the first datacenter;

assigning the second proxy-implementing machine to establish a fifth connection with the reverse proxy to provide access to the second resource;

establishing a sixth connection between the second and fourth proxy-implementing machines to forward messages between the second client and the reverse proxy through the fourth, fifth, and sixth connections.

6. The method of claim 1 further comprising deploying a fourth proxy-implementing machine to process control channel communications with the reverse proxy.

7. The method of claim 6, wherein the first, second, third, and fourth proxy-implementing machines are Pods.

8. The method of claim 6, wherein the first, second, third, and fourth proxy-implementing machines are containers.

9. The method of claim 6, wherein the first, second, third, and fourth proxy-implementing machines are virtual machines.

10. The method of claim 1, wherein the first, second, and third connections are layer 4 connections.

11. The method of claim 1, wherein the first client operates in one public cloud with the first, second, and third proxy-implementing machines.

12. The method of claim 1, wherein the first client operates in a first public cloud while the first, second, and third proxy-implementing machines operate in a different, second public cloud.

13. A cloud proxy that provides in a scalable manner access to resources in a first datacenter to clients operating in one or more public clouds, the cloud proxy comprising:

a plurality of client-side proxy machines to receive requests to access resource in the first datacenter from client machines executing outside of the first datacenter, said client-side proxy machines operating outside of the first datacenter and establishing connections with the client machines, the plurality of client-side proxy machine comprising virtual machines implemented on computer hardware;

a plurality of RP-side proxy machines to establish connections with a reverse proxy that operates in the first datacenter and that provides access to the resources, the RP-side proxy machines operating outside of the first datacenter and having connections formed with corresponding client-side proxy machines to forward messages between the client machines and the reverse proxy; and at least a control proxy machine to establish control channel communication with the reverse proxy, and through the control channel communication, to direct the reverse proxy to establish new connections with RP-side proxy machines for new connection requests from the client machines.

14. The cloud proxy of claim 13, wherein the proxy machines are Kubernetes Pods.

15. The cloud proxy of claim 13, wherein the proxy machines are containers.

16. The cloud proxy of claim 13, wherein the proxy machines are virtual machines.

17. The cloud proxy of claim 13, wherein the connections are layer 4 connections.

18. The cloud proxy of claim 13, wherein the proxy machines and client machines are in public clouds and the first datacenter is a private datacenter of an entity.

* * * * *